United States Patent [19]

Lherm et al.

[11] Patent Number: 4,837,661
[45] Date of Patent: Jun. 6, 1989

[54] DEVICE FOR STORING ELECTRICAL ENERGY AT VERY HIGH VOLTAGE, PARTICULARLY FOR HIGH ENERGY DENSITY MARX GENERATOR, AND ELECTRODE FOR SUCH A DEVICE

[75] Inventors: André Lherm, Haillan; Bernard Raveu, St-Medard-En-Jalles; Alain Nicolas, Reyrieux, all of France

[73] Assignee: Aerospatiale Societe Nationale Industrielle, Paris, France

[21] Appl. No.: 254,228

[22] Filed: Oct. 6, 1988

[30] Foreign Application Priority Data

Oct. 19, 1987 [FR] France ................... 8714374

[51] Int. Cl.$^4$ .......................... H01G 4/38; H02M 3/18
[52] U.S. Cl. ..................................... 361/329; 307/110
[58] Field of Search ............... 361/329, 326; 307/110; 313/309

[56] References Cited

U.S. PATENT DOCUMENTS

| 4,645,941 | 2/1987 | Nicolas | 307/110 |
| 4,680,671 | 7/1987 | Brion et al. | 361/329 |

FOREIGN PATENT DOCUMENTS

| 0162766 | 11/1985 | European Pat. Off. |
| 0210383 | 12/1986 | European Pat. Off. |
| 0526650 | 7/1921 | France |
| 0028727 | 3/1925 | France |
| 1570953 | 6/1969 | France |

OTHER PUBLICATIONS

Japanese Journal of Applied Physics, vol. 20, No. 12, Dec. 1987, pp. 2397-2400 entitled, "Study of the Rectangular-Like Output Waveforms of a 720 kV Coaxial Marx Generator" by Yusuke Kubota et al.

Primary Examiner—Donald Griffin
Attorney, Agent, or Firm—Fisher, Christen & Sabol

[57] ABSTRACT

This invention relates to a device for storing very high voltage electrical energy, of the type comprising a plurality of capacitor stages of which each is in the form of a ring and is provided, at each of the end faces of the corresponding capacitor, with at least one electrode, said rings being coaxial and distributed along their common axis, each electrode being radial with respect to the corresponding ring and being constituted by a thin metal band of which the plane is of general direction perpendicular to said common axis and parallel to said end faces of said rings, wherein, at least concerning certain portions of said electrodes which lie opposite an end face of the corresponding capacitor stage, the longitudinal edges of said electrodes are rounded, so as not to present any longitudinal end edge opposite said end face.

18 Claims, 5 Drawing Sheets

DEVICE FOR STORING ELECTRICAL ENERGY AT VERY HIGH VOLTAGE, PARTICULARLY FOR HIGH ENERGY DENSITY MARX GENERATOR, AND ELECTRODE FOR SUCH A DEVICE

The present invention to a device for storing very high voltage electrical energy, particularly, although not exclusively, adapted to be used in Marx generator, as well as to the electrodes of such a storage device.

This invention is a result of the collaboration between the Départment d'Electortechnique de l'Ecole Centrale de Lyon (Unit associated with the CNRS No. 829) and the Laboratoire d'Essais Electromagnétiques of Applicants' Aquitaine Establishment.

A Marx generator is known to be constituted by a plurality of capacitor stages which ar charged in parallel and discharged in series. Each capacitor stage may be charged under voltages greater than several hundreds of kilovolts, with the result that the voltage and energy available at the output of said generator may respectively attain some megavolts and some tens of kilojoules.

For example, in the JAPANESE JOURNAL OF APPLIED PHYSICS, Vol. 20 (1981), Dec., No. 12, Yusuke KUBOTA, Jun-ichi KODAIRA and Akira MIYAHARA described a Marx generator in which each capacitor stage is in the form of a ring, said rings being disposed parallel to one another, coaxially to a common axis. For its junction to the dischargers located in the vicinity of said axis, each capacitor stage is provided, at each of its ends, with at least one electrode, these electrodes being radial with respect to the corresponding ring and constituted by thin metal bands (metal foil) of which the planes are at least substantially perpendicular to said common axis and parallel to the faces of said rings. In fact, in order to reduce to a maximum the total inductance of each stage, each of the ends of a capacitor stage is connected to a discharger by a plurality of radial electrodes, distributed about said common axis. Moreover, each capacitor stage is, with its electrodes, coated with a dielectric resin.

In order to reduce the volume of the generator, each stage is, of course, made as compact as possible.

Due to this desired compactness and to the plurality of electrodes associated with each stage, there therefore exist in the energy storage devices of this type, numerous points close to one another and taken to high, opposite potentials. The risks of puncture are therefore considerable.

Furthermore, due to their structure, the electrodes have a weak mechanical rigidity, with the result that they are deformed at the moment of moulding of the dielectric coating resin and it is virtually impossible to respect, at any point of an electrode, the safety distance having to separate it from points of high opposite potentials. The risks of puncture are therefore further increased.

It is an object of the present invention to overcome these drawbacks.

To that end, according to the invention, the device for storing very high voltage electrical energy, particularly for a Marx generator, of the type comprising a plurality of capacitor stages of which each is in the form of a ring and is provided, at each of the end faces of the corresponding capacitor, with at least one electrode, said rings being coaxial and distributed along their common axis, each electrode having at least one radial portion with respect to the corresponding ring and being constituted by a thin metal band of which the plane is at least substantially perpendicular to said common axis and parallel to said end faces of said capacitor, is noteworthy in that, at least concerning certain portions of said electrodes which lie opposite an end face of the corresponding capacitor, the longitudinal edges of said electrodes are rounded, so as not to present any longitudinal end edge opposite said end face.

In this way, the risks of puncture between said electrodes and the points of the capacitor at high, opposite potentials, are reduced. Moreover, said rounded longitudinal edges provide for said electrodes a rigidity opposing deformation thereof during moulding of the coating.

When, in known manner, in the electrical energy storage device, the voltage is applied and collected between the outer and inner peripheries of the capacitor of each stage, whilst the terminals of said capacitor stage are disposed centrally in the vicinity of said common axis, with the result that each capacitor stage comprises at least one long electrode, outside said capacitor, connecting said outer periphery to one of said central terminals, it is advantageous if at least that part of said long electrode dispodsed in the vicinity of the inner periphery of the capacitor is provided with such rounded longitudinal edges.

This latter feature is all the more important as, for reasons of compactness, said central terminals are most often disposed at least approximately in the plane of the end faces of said capacitor, so that said long electrode comprises a bend in the vicinity of said inner periphery, to bring it closer to said capacitor.

In the storage devices of the type described hereinabove, there is provided at least one other, shorter electrode, connecting the inner periphery of said capacitor to the other of said terminals. Particularly for purposes of rigidity, it is preferable if each of said electrodes (both long and short) is provided with such rounded longitudinal edges over the greater part of its length.

The present invention also relates to an electrode for a device for storing very high voltage electrical energy, of the type comprising a plurality of capacitor stages of which each is in the form of a ring, and is provided, at each of the end faces of the corresponding capacitor, with at least one electrode, said rings being coaxial and distributed along their common axis, each electrode having at least one radial portion with respect to the corresponding ring and being constituted by a thin metal band whose plane is of a general direction perpendicular to said common axis and parallel to said end faces of said capacitors, and this electrode is characterized in that, at least concerning certain of its portions which lie opposite an end face of the corresponding capacitor, the longitudinal edges of said electrode are rounded, so as not to present any longitudinal end edge opposite said end face.

When said electrode is intended for an energy storage device in which voltage is applied and collected between the outer and inner peripheries of the capacitor of each stage, whilst the terminals of said capacitor stage are disposed centrally in the vicinity of said common axis, said electrode connecting said outer periphery to one of said central terminals, it is noteworthy in that at least that part thereof disposed in the vicinity of the inner periphery of the capacitor is provided with such rounded longitudinal edges.

Said electrode is preferably provided with such rounded longitudinal edges over the greater part of its length.

If, moreover, said electrode is provided for a device for storing very high voltage electrical energy, of the type comprising a plurality of capacitor stages of which each is in the form of a ring, and is provided, at each of the end faces of the corresponding capacitor, with at least one electrode, said rings being coaxial and distributed along their common axis, each electrode having at least one radial portion with respect to the corresponding ring and being constituted by a thin metal band of which the plane is of general direction perpendicular to said common axis and parallel to said end faces of said capacitors, the voltage being applied and collected between the outer and inner peripheries of the capacitor of each stage, whilst the terminals of said capacitor stage are disposed centrally in the vicinity of said common axis, said electrode connecting the inner periphery to one of said central terminals, it is noteworthy in that it is provided with such rounded longitudinal edges over the greater part of its length.

Said rounded longtidinal edges may be obtained by curving longitudinal portions of said electrode. In that case, it is preferable, in order to eliminate any risk of puncture between the electrode and the capacitor, if said curving be cylindrical and extend over an angular amplitude of at least 180°, and preferably of 225°.

In a particular embodiment, in which the electrode is made of a metal band 0.4 to 0.5 mm thick and intended to be taken to a potential of the order of 50 KV, the radius of curvature is advantageously of the order of 2.5 mm.

In a variant embodiment, said rounded longitudinal edges are formed by round or tubular rods added laterally to said electrode. In that case, said thin metal band may be diametral with respect to said rods, or be eccentric with respect to the diametral plane of said rods.

Moreover, said electrode may be constituted by two parallel thin metal bands connected via said rods.

The thin metal band or bands and the rods are preferably fashioned separately to the shape desired for the electrode, then assembled after shaping, for example by welding.

Said electrode advantageously comprises, at each of its ends, an extension without rounded longitudinal edges, with a view to connection thereof, on the one hand, to one of said terminals of the capacitor and, on the other hand, to one of the inner or outer peripheries of said capacitor.

The present invention also relates to a Marx generator, comprising the electrical energy storage device and/or the electrodes specified hereinabove.

Such a Marx generator may comprise an electrical field distribution element which is disposed between an electrode and said capacitor, at a point of high concentration of electrical field. This electrical field distribution element may be an electrically conducting ring shaped to follow the general form of said electrode.

The invention will be more readily understood on reading the following description with reference to the accompanying drawings, in which.

Figure 1:
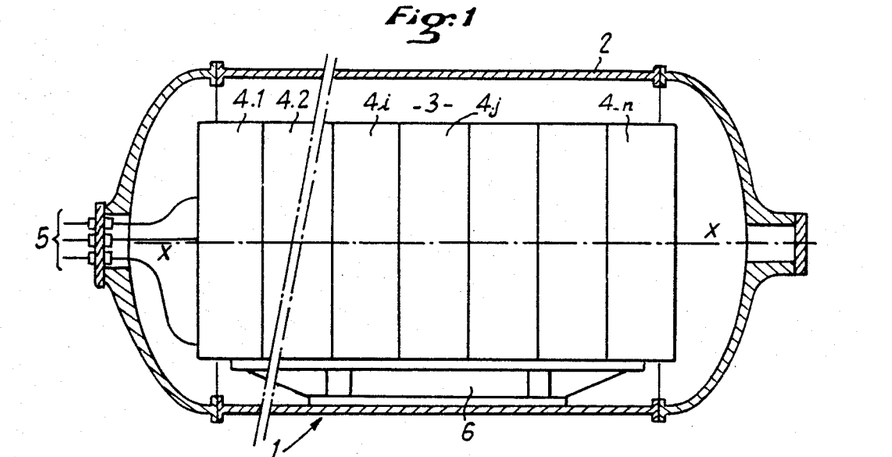
FIG. 1 schematically shows a Marx generator in longitudinal section.
Figure 2:
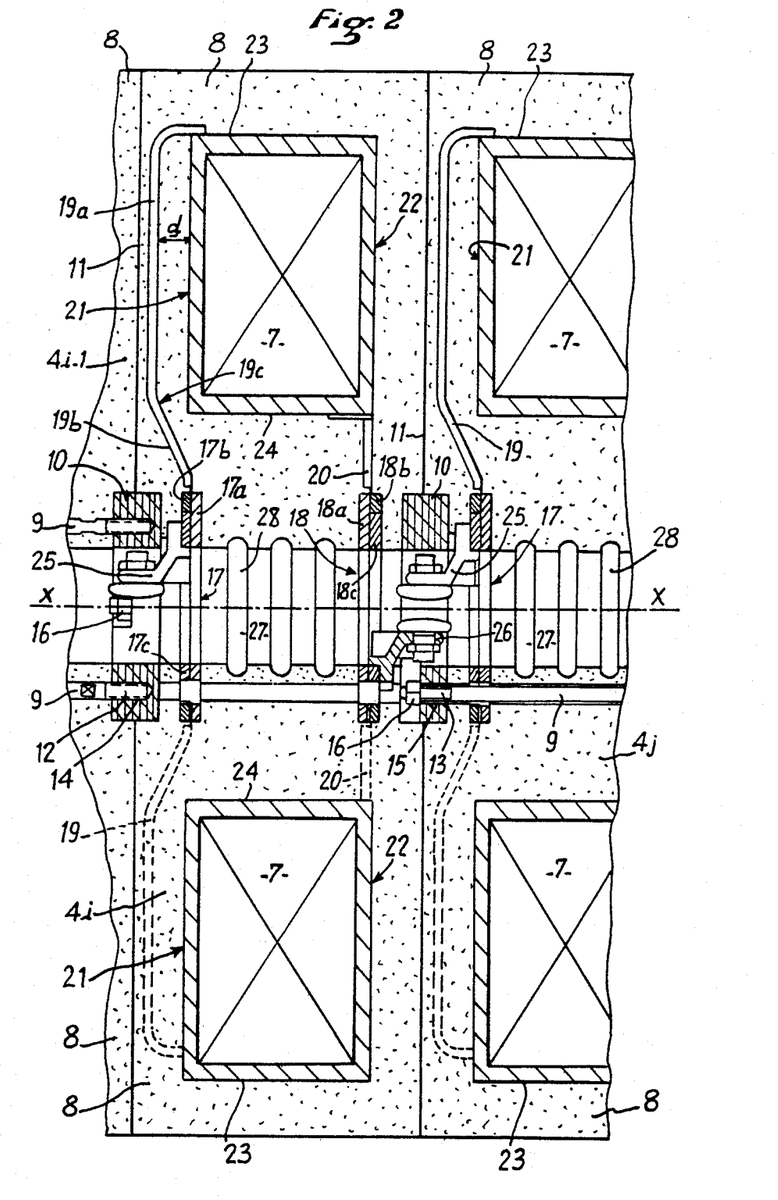
FIG. 2 is a diametral section, on a larger scale, partially illustrating the structure of a capacitor stage and its connection to the adjacent stages.
Figure 3:
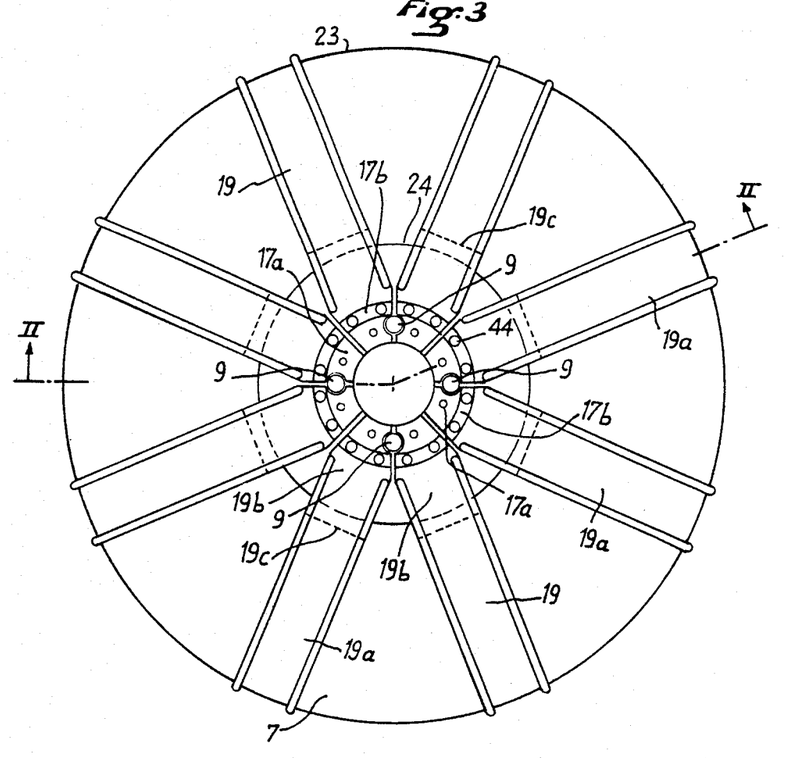
FIG. 3 is a front view of a capacitor of such a stage, showing the distribution of the long electrodes.

Referring now to the drawings, the Marx generator 1, shown schematically in FIG. 1, comprises a tight envelope 2, defining an enclosure 3, inside which prevails an environment of a dielectric gas, for example sulfur hexafluoride $SF_6$. In enclosure 3 are arranged a plurality of capacitor stages 4.1, 4.2, . . . 4.i, 4.j, . . . 4.n which, as may be more clearly seen in FIGS. 2 and 3, are each in the form of a ring—or torus—of rectangular section. These capacitor stages are all mounted coaxially to an axis X—X and are juxtaposed along said axis. Said capacitor stages are electrically connected in known manner, which has not been shown, particularly via resistors (not shown), in order to be able to be charged in parallel, then discharged in series. Moreover, electrical connections 5 connect said capacitor stages to electrical control devices (not shown), outside the envelope 2.

Furthermore, as will be more apparent on reading the description further, the capacitor stages 4.1 to 4.n are mechanically fast with one another and the assembly thereof is mechanically borne by a support or several supports 6, connecting them to the envelope 2. For example, the common axis X—X is horizontal and the support 6 forms a base, which supports said capacitor stages and which is itself supported by said envelope 2.

FIG. 2 schematically shows in axial section any one 4.i of said capacitor stages, as well as, partially, the capacitor stages 4.i-1 and 4.j which are respectively disposed on either side of said stage 4.i.

As may be seen, each capacitor stage comprises a capacitor 7 in the form of a ring, centred on axis X—X and embedded in a coating of dielectric resin 8.

Coatings 8 are themselves in the form of a ring coaxial to axis X—X and comprise end faces 11, by which they may abut against one another.

The consecutive capacitor stages are mechanically connected to one another thanks to connecting tie-rods 9, abutting on centering rings 10. Each centering ring 10 is fitted in opposite central recesses provided in the end and supporting faces 11 of the consecutive coatings 8. Each tie-rod 9 is provided at each of its ends with threads 12 and 13 which either screw in tappings 14 in said rings 10 or pass freely through bores 15 thereof. On the threads 13 are screwed forcing nuts 16. Each ring 10 comprises tappings 14 and bores FIG. 2 does not show the electrical links between the consecutive capacitor stages. On the other hand, the terminals 17 and 18 of each capacitor stage and the corresponding electrodes 19 and 20 have been shown. As is known, electrodes 19 and 20 are constituted by thin metallic bands (for example some tenths of mm), generally referred to as metal foil.

Each terminal 17 and 18 presents an annular form and is disposed in the vicinity of axis X—X, with respect to which it is coaxial. Moreover, said terminals 17 and 18 each lie, respectively and at least approximately, in the plane of the end faces 21 or 22 of the capacitors 7. In this way, axial space requirement of each stage may be minimum.

The annular terminal 17 of each stage is connected, by a plurality of radial electrodes 19 (cf. FIG. 3 in which it has been assumed that coating 8 was eliminated), to the outer periphery 23 of the corresponding capacitor 7. The electrodes 19 are therefore long. They comprise an elongated flat part 19a, parallel to the corresponding end face 21 of the associated capacitor 7 and spaced apart from said face by a distance d. However, in order to join the annular terminal 17, it must, in addition, comprise an inclined central part 19b, connected to the flat part 19a by a bend 19c, lying in the vicinity of the inner periphery 24 of said capacitor 7.

Furthermore, the annular terminal 18 of each capacitor stage is connected, by a plurality of radial electrodes 20 (of which the star arrangement is not shown but is advantageously similar to that of electrodes 19, as shown in FIG. 3), to the inner periphery 24 of the corresponding capacitor 7. Electrodes 20 are therefore shorter than electrodes 19. Moreover, since they are housed inside said inner periphery 24, they may be rectilinear over the whole of their length.

The plane of portions 19a of electrodes 19 and the plane of electrodes 20 are at right angles to axis X—X. By way of example, these electrodes may be made of metal bands, 4 to 5 tenths of mm thick and 50 mm wide. The length of portions 19a of electrodes 19 may be of the order of 150 mm.

Terminals 17 and 18 are respectively fast with dischargers 25 or 26, housed in the central recess 27 of the capacitor stages and disposed so that the discharger 25 of one stage may cooperate with the discharger 26 of the following stage.

Grooves 28 may be made in the wall of said central recess 27 in order to eliminate electrical conduction by skin effect.

Figure 4:
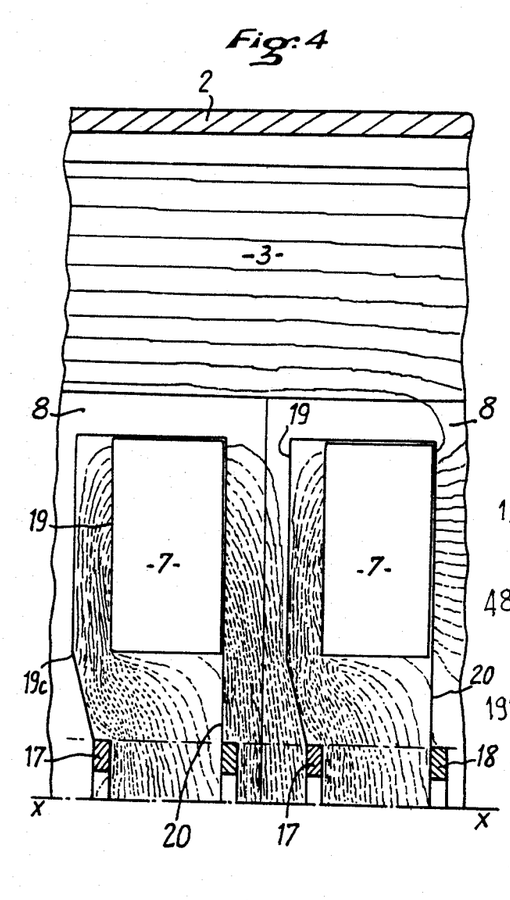
FIG. 4 schematically illustrates the lines of electric field at the moment of charging of said stages.

From the foregoing description, it clearly results that, for each capacitor 7, the voltage is applied and collected between the outer and inner peripheries 23 and 24 of said capacitor and that, in order to occupy the smallest possible axial space, the distance d must be just sufficient to avoid punctures between electrodes 19 and capacitors 7 and the terminals 17 must be brought closer to the centre of said capacitors 7, in order to enable the dischargers 25 of one stage to be disposed opposite the dischargers 26 of an adjacent stage. As a result, between the bend 19c of an electrode 19 and the inner periphery 24, the electric field is very high, since this electrode 19 and this inner periphery 24 are taken to high, opposite potentials. By way of example, the difference in potential between the electrode 19 and the inner periphery 24 (i.e. the difference in potential between electrodes 19 and 20), may be of the order of 100 kV during charging of the capacitors. There are therefore risks of puncture at the level of said bends 19c. FIG. 4 schematically shows the electric field patterns during charging of the capacitors 7. It is seen that a high density of field patterns exists between the bends 19c and the capacitors 7 during charging of the latter.

The risks of puncture at the level of said bends are further increased since, in order to reduce the inductance of said capacitor stages, a large number of electrodes 19 is provided per stage (eight in the example shown) and since, by their structure with small thickness, large width and large length, the electrodes 19 do not present a sufficient mechanical strength in order not to be deformed at the moment of moulding the coatings 8. Due to this low mechanical strength of the electrodes 19, the distance d therefore risks being less in reality than the value calculated to avoid punctures.

In order to overcome these drawbacks, according to the invention, the longitudinal edges of the electrodes 19 and 20 are rounded opposite the corresponding capacitor 7. The resistance to puncture between the electrodes and the capacitors is thus increased, since said longitudinal edges do not present any sharp edge opposite said capacitors.

FIGS. 5a to 5g show several examples of sections according to the invention for the electrodes 19 and 20. In each of the Figures, the capacitor 7 (not shown) would be disposed beneath the corresponding electrode 19 or 20.

Figure 5A:
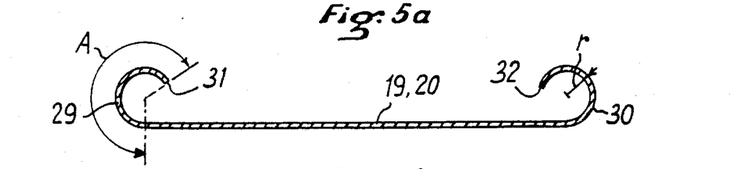
FIGS. 5a to 5g show, in section, several embodiments of the electrodes according to the invention.
Figure 5B:
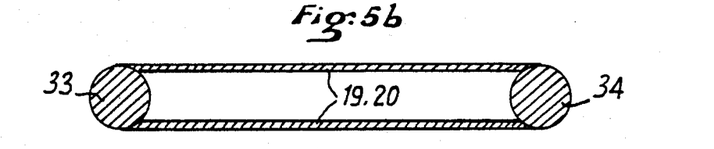
Figure 5C:
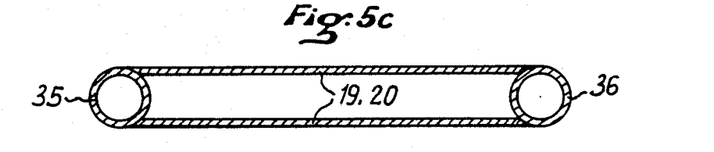

In FIG. 5a, the longitudinal edges of the electrodes 19 and 20 are simply curved on the side opposite the corresponding capacitor 7, in order to form cylindrical beadings 29 and 30. In that case, it is advantageous if the angle of curvature A is at least equal to 180°, and preferably of the order of 225° C., so that the end edges 31 or 32 of said beadings are perfectly insulated from the capacitor 7 by the electrode 19 or 20, respectively. By way of example, for a thickness of 0.4 mm of the metal foil constituting said electrodes, it is advantageous if the radius r of said cylindrical beadings is of the order of 2.5 mm. In FIGS. 5b and 5c, each electrode 19 and 20 is constituted by two parallel bands of metal foil, fast along their longitudinal edges, for example by welding, with round rods 33 and 34 (FIG. 5b) or with tubes 35 and 36 (FIG. 5c).

Figure 5D:
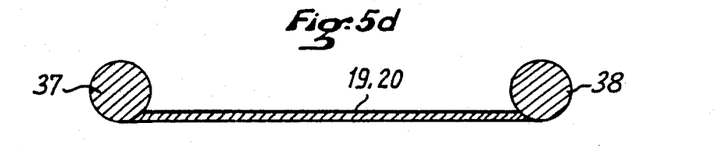
Figure 5E:
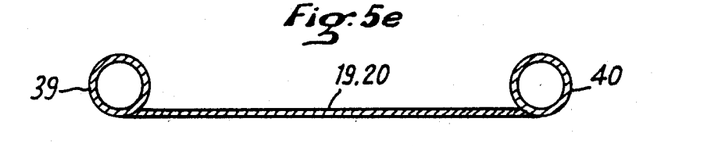
Figure 5F:
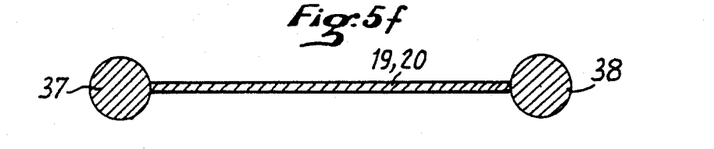
Figure 5G:
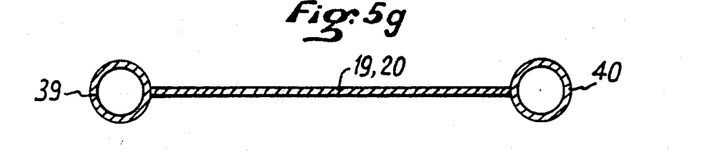

In FIGS. 5d and 5e, each electrode 19 and 20 is constituted by one single band of metal foil, fast along its longitudinal edges, for example by welding, with round rods 37 and 38 (FIG. 5d) or with tubes 39 and 40 (FIG. 5e), said bands of metal foil being offset with respect to the centres of said rods and tubes. FIGS. 5f and 5g show two variant embodiments, corresponding respectively to those of FIGS. 5d and 5e, the bands of metal foil then being disposed diametrically with respect to said rods and tubes.

FIGS. 6 to 10 illustrate the embodiment of the electrodes 19 and 20 shown in FIGS. 2 and 3 in accordance with the embodiment of FIG. 5e.

Each electrode 19 ( cf. FIGS. 6 to 8) is bordered, on the side opposite the corresponding capacitor 7, by two lateral tubes 39 and 40, welding on said electrode. In addition to portions 19a, 19b and 19c described hereinbefore, an electrode 19 comprises a return portion 19d which is substantially parallel to axis X—X, for its link with the outer periphery 23 of the capacitor 7.

Figure 6:
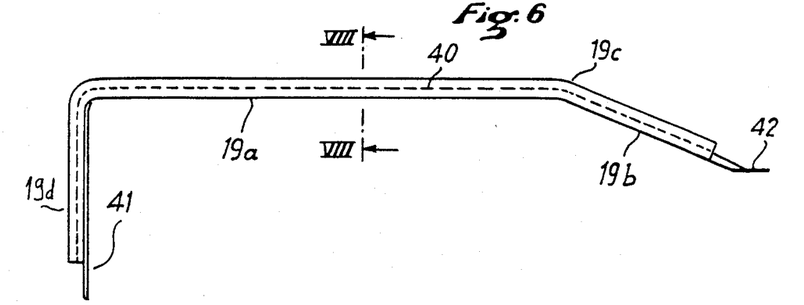
FIGS. 6, 7 and 8 are, respectively, front, top and half-sectional view along line VIII—VIII of FIG. 6, of a long electrode for the Marx generator of FIGS. 1 to 3.
Figure 7:
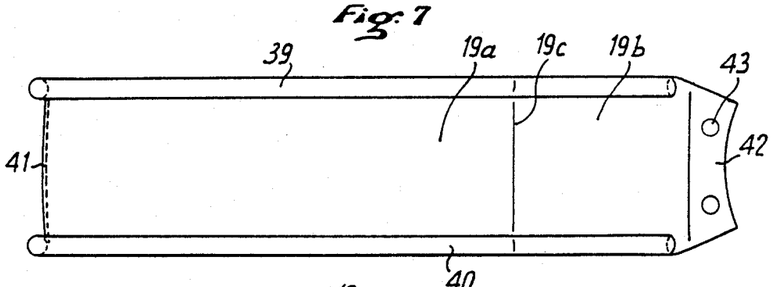
Figure 8:
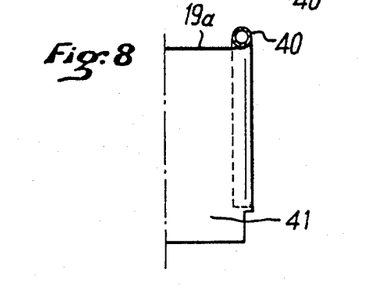
Figure 9:
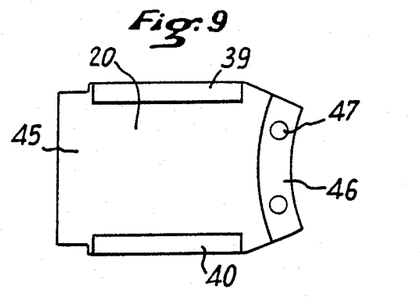
FIGS. 9 and 10 show, respectively in plan and end view, a short electrode for the Marx generator of FIGS. 1 to 3.
Figure 10:
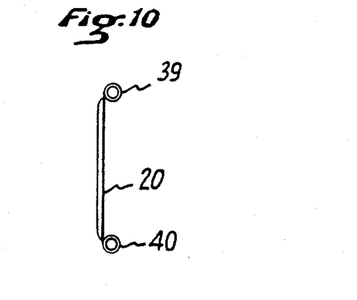

To that end, the band of metal foil constituting the electrode 19 comprises an extension 41 for fixation to said periphery, for example by welding.

Similarly, the band of metal foil of the bent part 19b of an electrode 19 comprises an extension 42, for fixation to a terminal 17. This latter may to that end be constituted by a ring 17a and sectors 17b pressing therebetween said extensions 42 which are provided with holes 43 for the passage of screws 44 intended to press said extensions between said ring 17a and one of said sectors 17b. The dischargers 25 are then borne by a ring 17c, inside the sectors 17b and in mechanical and electrical connection with the rest (17a, 17b) of the respective terminals 17. The tubes 39 and 40 and the band of metal foil constituting each electrode 19 are formed separately in the form of the latter, then assembled by welding.

Similarly, each electrode 20 (cf. FIGS. 9 and 10) is bordered by lateral tubes 39 and 40 welded thereon. The metal foil of an electrode 20 comprises extensions 45 and 46, respectively, for fixation and electrical connection to the inner periphery 24 of the corresponding capacitor 7 and to a terminal 18. The extensions 46 are pierced with holes 47 and the terminals 18 comprise a structure (similar to that of terminals 17) composed of a ring 18a and of pressure sectors 18b. In this way, said extensions 46 may be pressed between a ring 18a and sector 18b, via screws (not shown). The dischargers 26 are fast with a ring 18c, inside the sectors 18b and in mechanical and electrical connection with the other constituents (18a, 18b) of the respective terminals 18. There again, the tubes 39 and 40 and the band of metal foil constituting each electrode 20 are formed separately, then assembled by welding.

Figure 11:
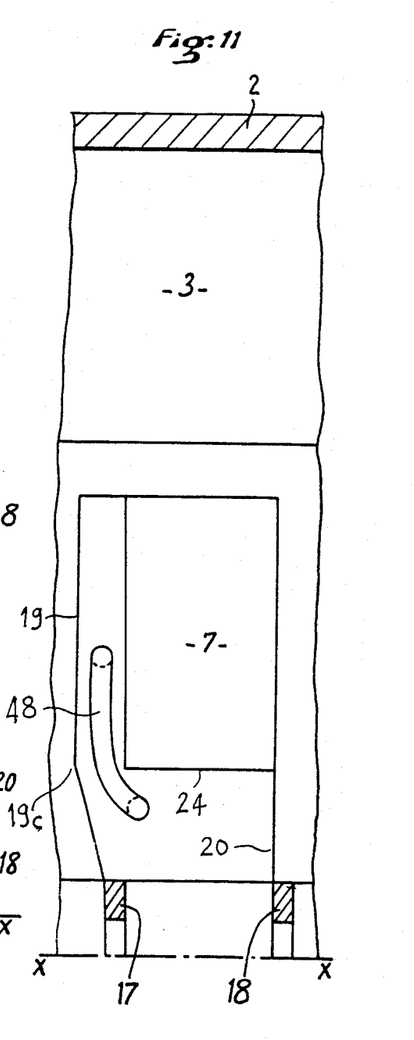
FIG. 11 illustrates an additional improvement according to the present invention.

In order further to reduce the risks of puncture between an electrode 19 and the inner periphery 24 of the corresponding capacitor 7, there may be disposed between said electrode and said inner periphery a device 48 for distributing electric field (cf. schematic FIG. 11). Such a device may be constituted by a conductive ring, curved to follow at least approximately the curved shape of said electrode 19.

What is claimed is:

1. In a device for storing very high voltage electrical energy, of the type comprising a plurality of capacitor stages of which each is in the form of a ring and is provided, at each of the end faces of the corresponding capacitor, with at least one electrode, said rings being coaxial and distributed along their common axis, each electrode having at least one radial portion with respect to the corresponding ring and being constituted by a thin metal band of which the plane is of general direction perpendicular to said common axis and parallel to said end faces of said rings.

the longitudinal edges of said electrodes are rounded, at least concerning certain portions of said electrodes which lie opposite an end face of the corresponding capacitor, so as not to present any longitudinal end edge opposite said end face.

2. The electrical energy storage device of claim 1, in which the voltage is applied and collected between the outer and inner peripheries of the capacitor of each stage, whilst the terminals of said capacitor stage are disposed centrally in the vicinity of said common axis, with the result that each capacitor stage comprises at least one long electrode, outside said capacitor, connecting said outer periphery to one of said central terminals, wherein at least that part of said long electrode disposed in the vicinity of the inner periphery of the capacitor is provided with such rounded longitudinal edges.

3. The electrical energy storage device of claim 1, wherein each of said electrodes is provided with such rounded longitudinal edges over the greater part of its length.

4. Electrode for a device for storing very high voltage electrical energy, of the type comprising a plurality of capacitor stages of which each is in the form of a ring, and is provided, at each of its end faces, with at least one electrode, said rings being coaxial and distributed along their common axis, each electrode having at least one radial portion with respect to the corresponding ring and being constituted by a thin metal band of which the plane is of a general direction perpendicular to said common axis and parallel to said end faces of said capacitors, wherein the longitudinal edges of said electrode are rounded, at least concerning certain of its portions which lie opposite an end face of the corresponding capacitor, so as not to present any longitudinal end edge opposite said end face.

5. The electrode of claim 4, for an energy storage device in which the voltage is applied and collected between the outer and inner peripheries of the capacitor of each stage, whilst the terminals of said capacitor stage are disposed centrally in the vicinity of said common axis, said electrode connecting said outer periphery to one of said central terminals, wherein at least that part of said electrode disposed in the vicinity of the inner periphery of the capacitor is provided with such rounded longitudinal edges.

6. The electrode of claim 5, wherein it is provided with such rounded longitudinal edges over the greater part of its length.

7. Electrode for a device for storing very high voltage electrical energy, of the type comprising a plurality of capacitor stages of which each is in the form of a ring, and is provided, at each of the end faces of the corresponding capacitor, with at least one electrode, said rings being coaxial and distributed along their common axis, each electrode having at least one radial portion with respect to the corresponding ring and being constituted by a thin metal band of which the plane is of general direction perpendicular to said common axis and parallel to said end faces of said capacitors, the voltage being applied and collected between the outer and inner peripheries of the capacitor of each stage, whilst the terminals of said capacitor stage are disposed centrally in the vicinity of said common axis, said electrode connecting the inner periphery to one of said central terminals, wherein said electrode is provided with rounded longitudinal edges over the greater part of its length.

8. The electrode of claim 4 or 7, wherein said rounded longitudinal edges are obtained by curving longitudinal portions of said electrode.

9. The electrode of claim 8, wherein said curving is cylindrical and extends over an angular amplitude of at least 180°, and preferably of 225°.

10. The electrode of claim 9, made of a metal band 0.4 to 0.5 mm thick and intended to be taken to a potential of the order of 50 kV, wherein the radius of curvature is of the order of 2.5 mm.

11. The electrode of claim 4 or 7, wherein said rounded longitudinal edges are formed by round or tubular rods.

12. The electrode of claim 11, wherein said thin metal band is diametral with respect to said rods.

13. The electrode of claim 11, wherein said thin metal band is eccentric with respect to the diametral plane of said rods.

14. The electrode of claim 11, wherein it is constituted by two parallel thin metal bands connected via said rods.

15. The electrode of claim 11, wherein the thin metal band or bands and the rods are fashioned separately to the shape desired for the electrode, then assembled after shaping.

16. The electrode of claim 6 or 7, wherein it comprises, at each of its ends, an extension without rounded longitudinal edges, with a view to connection thereof, on the one hand, to one of said terminals and, on the other hand, to one of the inner or outer peripheries of said capacitor.

17. Marx generator, wherein it comprises the electrical energy storage device as set forth in claim 1.

18. The Marx generator of claim 17 wherein an electrical field distribution element is disposed between an electrode and the capacitor, at a point of high concentration of electrical field.

* * * * *